United States Patent [19]

Lewis

[11] Patent Number: 4,787,770
[45] Date of Patent: Nov. 29, 1988

[54] LOCKING DEVICE FOR AIR HOSE COUPLING DEVICES OF TRACTOR TRAILERS

[76] Inventor: Buford Lewis, 490 Corte Arqueta, Morgan Hill, Calif. 95037

[21] Appl. No.: 70,390

[22] Filed: Jul. 7, 1987

[51] Int. Cl.⁴ .............................................. B25G 3/00
[52] U.S. Cl. ................................... 403/317; 403/341; 285/82
[58] Field of Search ................. 403/316, 317, 341, 11; 285/82, 81, 91, 68, 74

[56] References Cited

U.S. PATENT DOCUMENTS

| 466,561 | 1/1892 | Gold | 285/68 |
| 3,945,669 | 3/1976 | Bochory | 285/82 |
| 4,289,335 | 9/1981 | Olbermann | 285/91 |
| 4,352,511 | 10/1982 | Ribble et al. | 285/91 |

FOREIGN PATENT DOCUMENTS 1513350  1/1968  France ................... 285/81

Primary Examiner—Andrew V. Kundrat
Attorney, Agent, or Firm—Richard C. Litman

[57] ABSTRACT

A tractor-trailer coupling safety device includes a housing mountable about the curved medial area of a pair of joined coupling elements and presenting opposed inwardly directed projections serving to contain and prevent the members from separating from the housing while allowing normal angular relative displacement between the joined coupling elements.

6 Claims, 5 Drawing Sheets

LOCKING DEVICE FOR AIR HOSE COUPLING DEVICES OF TRACTOR TRAILERS

FIELD OF THE INVENTION

This invention relates to the field of truck safety and especially to devices preventing the disengagement of high pressure pneumatic and hydraulic couplings between trucks and trailers.

BACKGROUND TO THE INVENTION

Tractor-trailer vehicles utilize couplings that carry highpressure air and hydraulic fluids between the tractor and trailer. The combination of pressured air and hydraulic fluid require that the coupling elements remain intact because a disablement can easily result in the brakes of the trailer failing or locking and possibly cause an accident.

This device relates to those safety apparatuses for the prevention of the mating components of a coupling from becoming disengaged, and, more particularly, relates to those couplings that connect air lines and hydraulic lines from a tractor to a trailer.

The present invention further relates to those safety devices that, in addition to preventing the accidental disengagement of the components of the coupling, also permits free movement within a range of angular rotation about an approximate centerpoint. With the coupling members extending from the safety device, they can follow the angular movements of the trailer as it follows the tractor in motion.

SUMMARY OF THE INVENTION

A primary object of the present invention is to provide a quick and inexpensive means for ensuring a secure connection of pneumatic and hydraulic lines. Through use of its cooperating components and safety means, the present apparatus prevents the connecting lines from disengaging while the vehicle is in transit.

Another object of the present invention is to provide a means for housing a coupling such that the coupling is enclosed and able to move in an angular manner umimpeded by the housing itself.

A still further object of the present invention is to provide a means for quick and positive installation of a protective device such that it will be readily apparent when the device is not adequately affixed to the coupling.

Still another object of the present invention is to provide a device that is economical and that accommodates virtually all standard types and sizes of pneumatic and hydraulic couplings between tractors and trailers.

DESCRIPTION OF THE PREFERRED EMBODIMENTS

Figure 1:
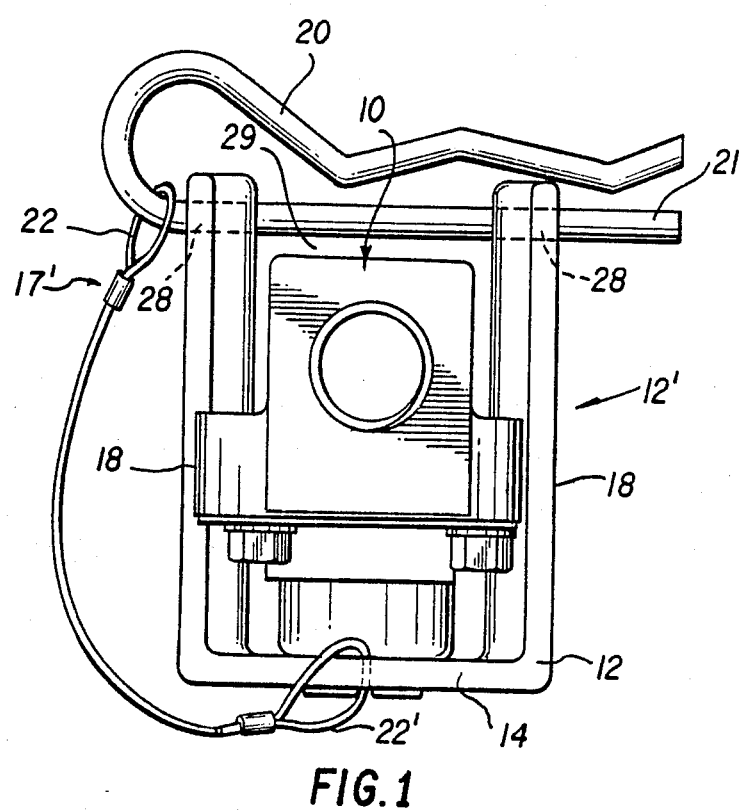
FIG. 1 is an end front view of the device in use.
Figure 2:
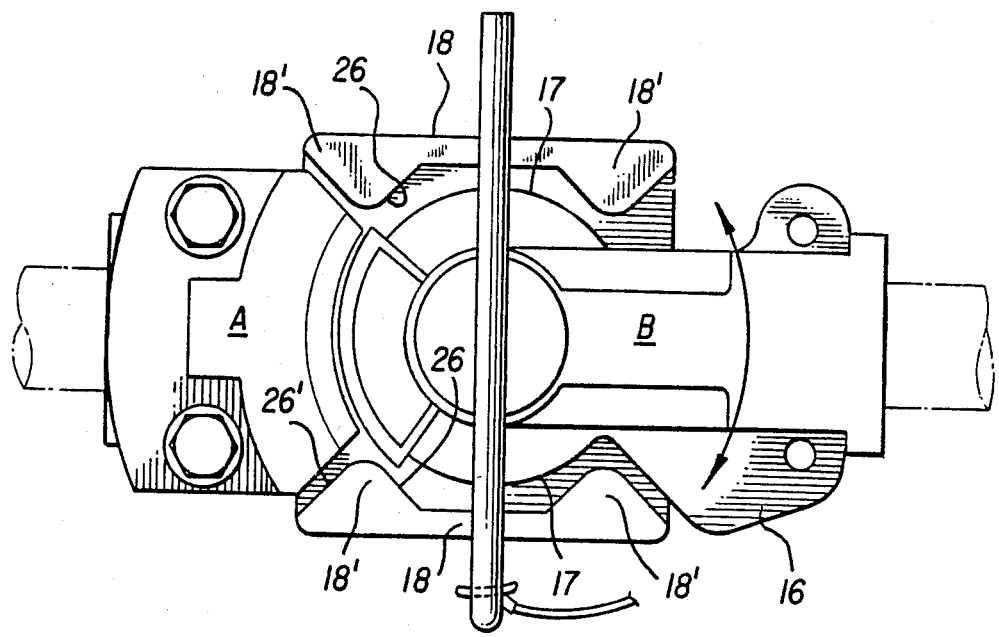
FIG. 2 is a top view of the device in use.
Figure 3:
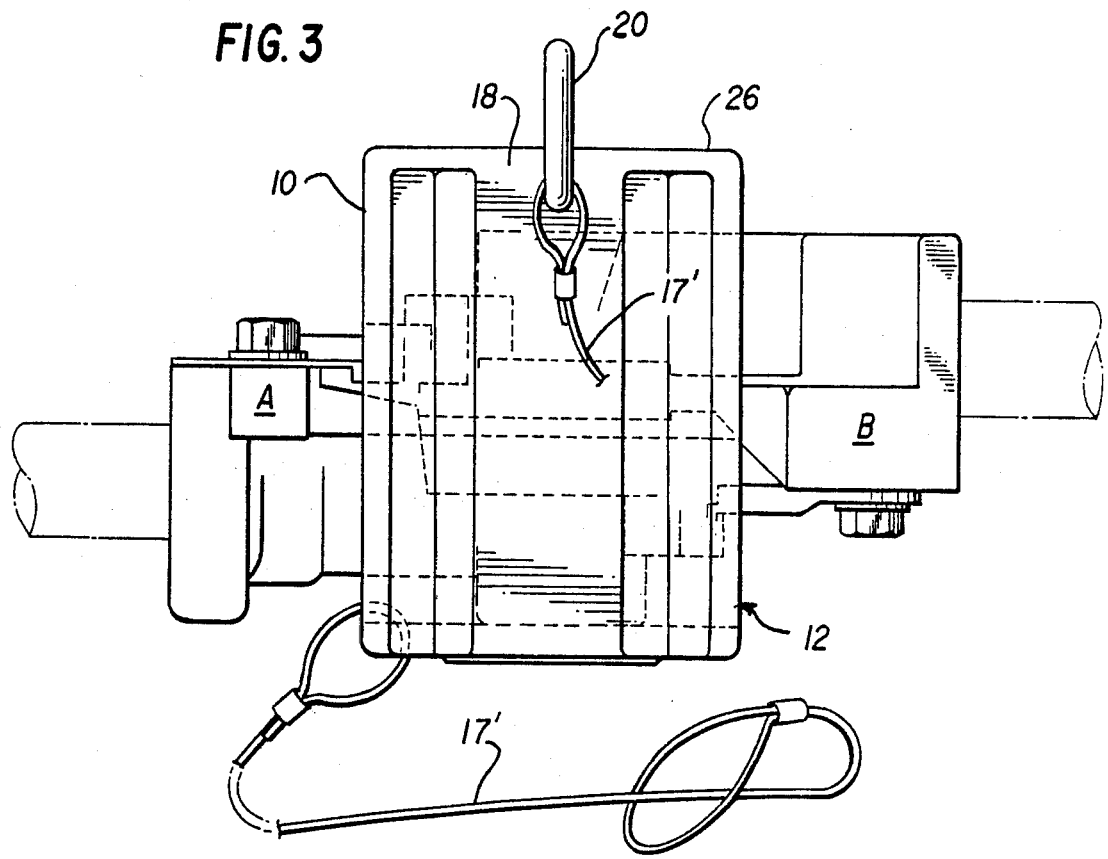
FIG. 3 is a side elevation view, showing the manner in which the coupling members extend through the device.
Figure 4:
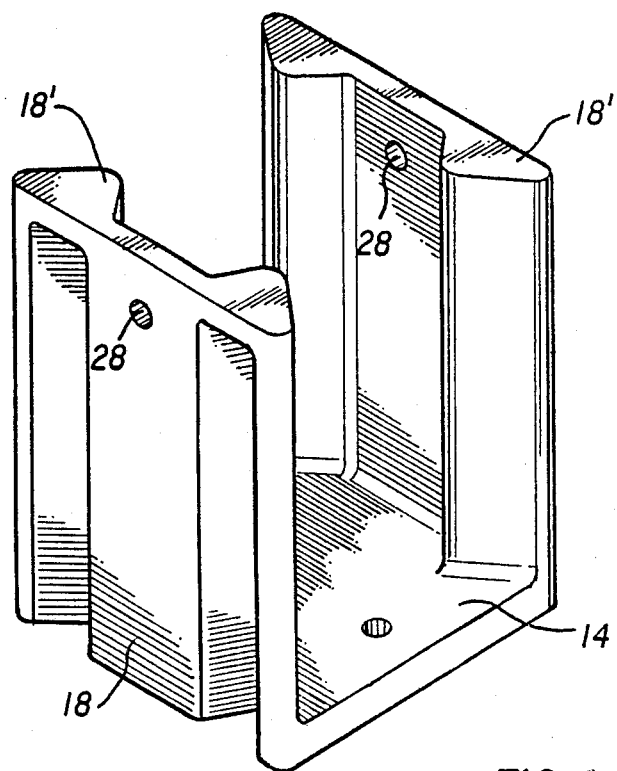
FIG. 4 is a perspective view of the housing, illustrating two upwardly projecting bilobal side walls thereon.

Referring now to FIGS. 1 through 4, the device 10 comprises a generally U-shaped coupler housing 12 including a planar base 14 joined to a pair of upright side arms or walls 18—18. These arms 18 are disposed substantially at right angles to the housing base 14 and extend upwardly therefrom to substantially encompass the two circular surfaces 17—17 of the medial portion of a coupler fitting 16, as formed by a joined first coupling member A and second coupling member B.

Each arm 18 includes a pair of inwardly directed projections or ribs 18' positioned to span each curvilinear configuration of coupler wall 17. In this manner, the projections 18' will be understood to restrain the movement of the coupling components A and B 12 and thereby prevent the first A and second B coupling members from along the longitudinal axis of the housing, from becoming disengaged from one another, or from slipping out of from the housing itself.

The opposed projections 18' are spaced one from the other so as to center the coupling assembly A-B within the housing 12 along an approximate vertical center-line passing through the medially disposed walls 17. The internal beveled edges 26 restrain separation or axial displacement between coupler components A and B, while the opposite or external beveled edges 26' allow one coupler component A or B to rotate angularly relative the other so as to accommodate motion between the tractor and trailer without compression of the housing. The plurality of projections ensure a secure but loose fit, such that the coupling will not disengage; it does, however, allow limited angular movement between the two coupler components.

The apex of the taper formed by the ribs 18' is rounded to provide a nonsharp surface to prevent the coupling from lodging or vibrating against the ribs and causing damage thereto. The distance between opposed ribs of the two side arms 18—18 will be understood to be less than the diameter of the coupling wall 17 so as to ensure the above-described function.

Housing 12 is secured to the coupling by lock means such as the illustrated linch pin 20, having a lower leg 21 which is deployed through a plurality of openings 28—28 in the upper portions of the arms 18—18. Once the securing pin 20 has been fastened through the openings 28—28, as shown in FIG. 1, the housing 12 will not fall away from its captive engagement of the couplers.

Lock pin 20 is configured such that once in place, its leg 21 extends between the medial portion of the side arms 18—18 and overlies the center, pivot axis of the joined couplers A and B, that is, in the embodiment of FIGS. 1-4. Thus, the device is mechanically captured on the coupling, making accidental disengagement extremely remote. As best shown in FIG. 1, only a nominal clearance 29 exists between the pin leg 21 and top of the couplings. A suitable tether 17' prevents the loss of the lock pin 20 and includes one end 22 engageable with the pin and an opposite end 22' affixed to the housing 12, such as to its base 14.

Figure 5:
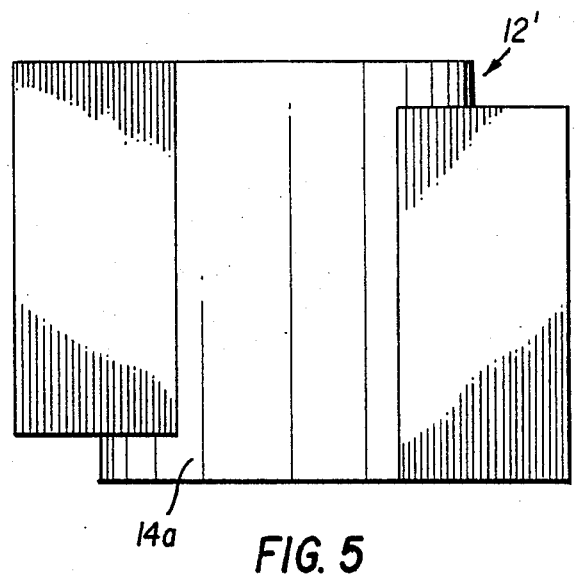
FIGS. 5 and 6 are front and top views of an alternative embodiment.
Figure 6:
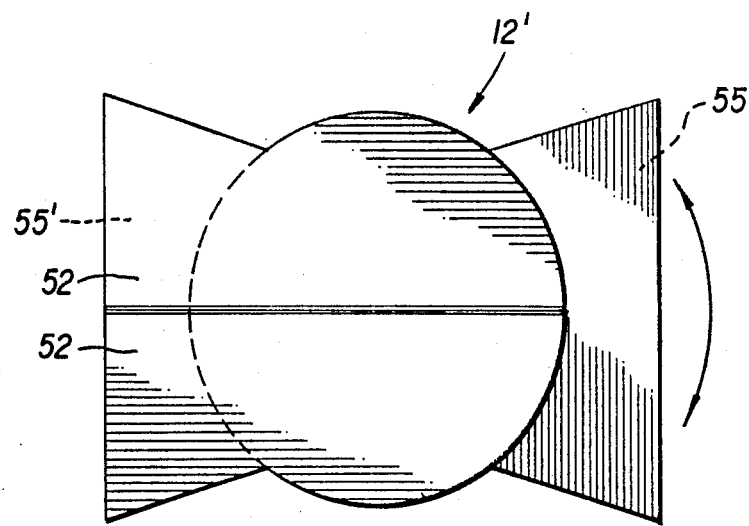
Figure 7:
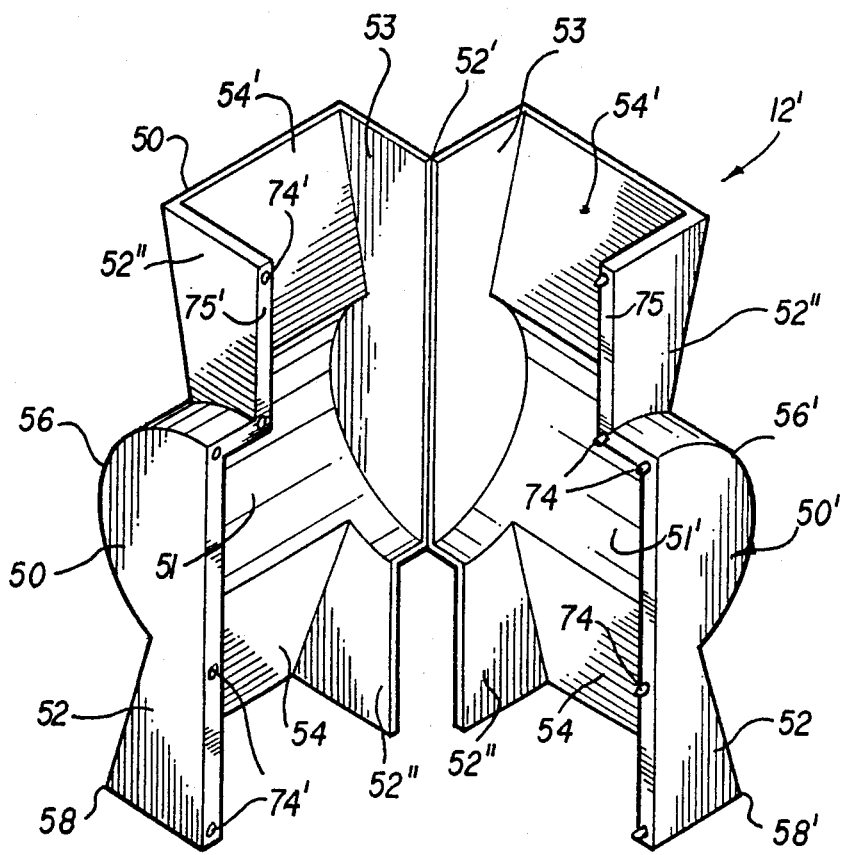
FIG. 7 is an exploded view of the alternative embodiment as shown in FIGS. 5 and 6.

Alternate configurations of the device 10 are possible, as is seen in FIGS. 5 through 7, it can be seen that the same functional considerations dictate the physical form of these embodiments as well. The housing 12' is curvilinear and comprises a unitary member having two mirror image half-sections 50-50' preferably joined along an edge by an integral or live hinge 52'. Each half-section or shell 50-50' includes a semi-cylindrical chamber or cavity 51-51' as defined by an arcuate side wall 56-56' and opposite end walls 52-53. Outwardly flared walls 54-54' project from opposite ends of the respective arcuate side walls to provide axially aligned divergent openings 55-55' communicating with the central cavity 51-51'. The offset walls 52" complete the housing body which is adapted to be snap-fitted about a coupling assembly by means of cooperating elements 74-74' on the two housing longitudinal edges 75-75'.

Figure 8:
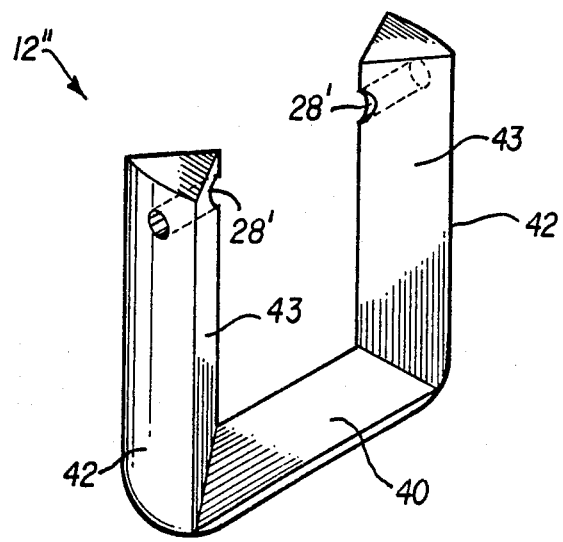
FIGS. 8, 9, and 10 are illustrations of still further alternative embodiments of the present invention.
Figure 9:
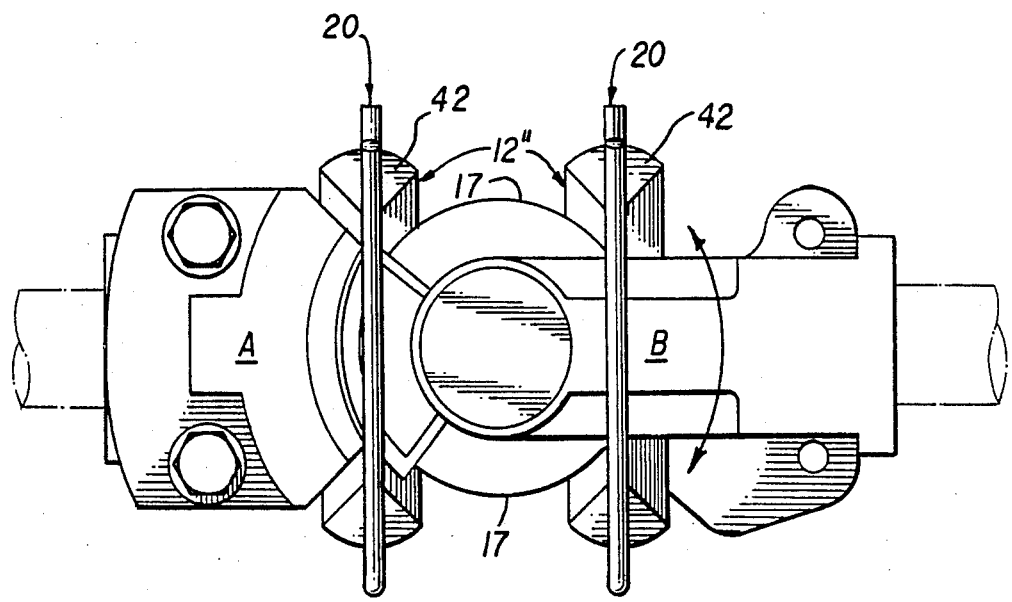

FIGS. 8 and 9 depict second alternate embodiment of the device 10 wherein the function of the housings 12-12' is accomplished by utilizing a pair of containment members 12" each comprising a base 40 and two side walls or arms 42—42, the latter having inward projections 43 configured similar to the projections 18' of the first described embodiment. The two members 12" are installed as shown in FIG. 9 to either side of the cylindrical coupling wall 17 and retained by the lock pins 20 insertable through the openings 28'.

Figure 10:
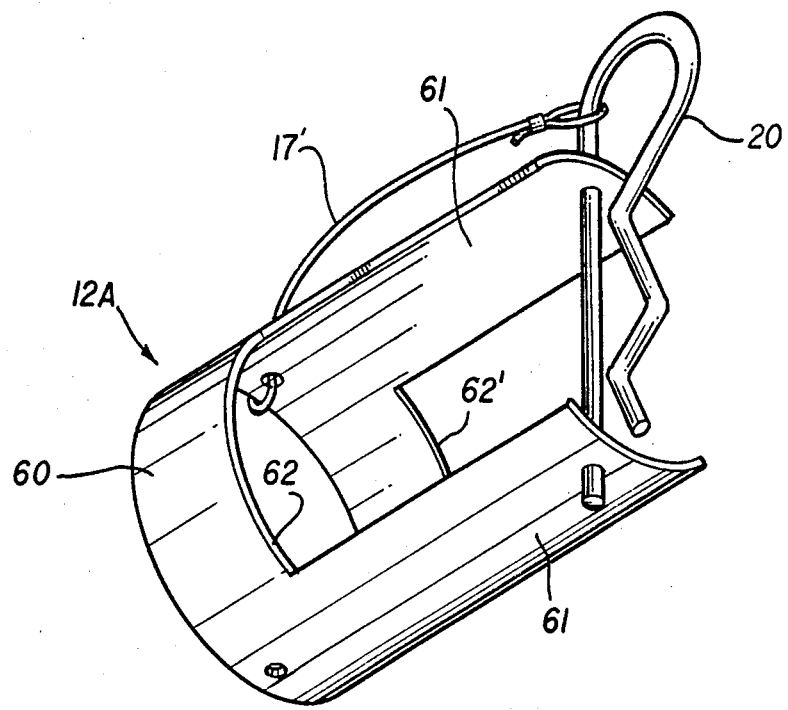

The remaining embodiment of FIG. 10 comprises a unitary housing or containment member 12a including a cylindrical base 60 provided with a pair of upwardly directed side walls or arms 61-61 adapted to surround the coupling walls 17 in a manner analogous to the side walls 18 of the housing 12. Again, a lock pin 20, retained by a tether 17', secures the housing 12a about a coupling to provide the protection as offered by all described embodiments of the invention.

What is claimed is:

1. A securing device for restraining the movement of a pair of joined couplings, said joined couplings forming a pair of circular surfaces which are constrained within said securing device, comprising:

housing means including a base and a pair of opposed side walls extending upwardly from said base;

each of said side walls having a pair of vertically disposed, inwardly directed projections, said pair of projections on each said side wall laterally spaced apart from one another a distance less than the diameter of said circular surfaces of said joined couplings, each said projection on one said side wall spaced fron one said projection on the other one said side wall a distance less than the diameter of said circular surfaces of said joined couplings, and said projections defining a cavity therebetween whereby, when said joined couplings are positioned within said cavity of said housing means said projections limit the extent to which said joined couplings may move relative to each other and relative to said housing means.

2. A securing device according to claim 1, including lock means removably attachable to said side walls and adapted to span said cavity atop said joined couplings therein.

3. A securing device according to claim 2, wherein said lock means includes a linch pin.

4. A securing device according to claim 2, including a tether joining said lock means to said housing means.

5. A securing device according to claim 1, wherein said housing means comprises a pair of U-shaped members.

6. A securing device according to claim 1, wherein said base of said housing means is hinged and said side walls further include covering means, said covering means perpendicularly disposed to said side walls, and fastening means operable to join together said covering means.

* * * * *